Jan. 16, 1962    G. W. REHFELD    3,016,967
MOTORCYCLE WITH WIDE TREAD WHEELS
Filed Sept. 21, 1959    2 Sheets-Sheet 1

INVENTOR.
George W. Rehfeld
BY
Paul E. Mullendore
ATTORNEY

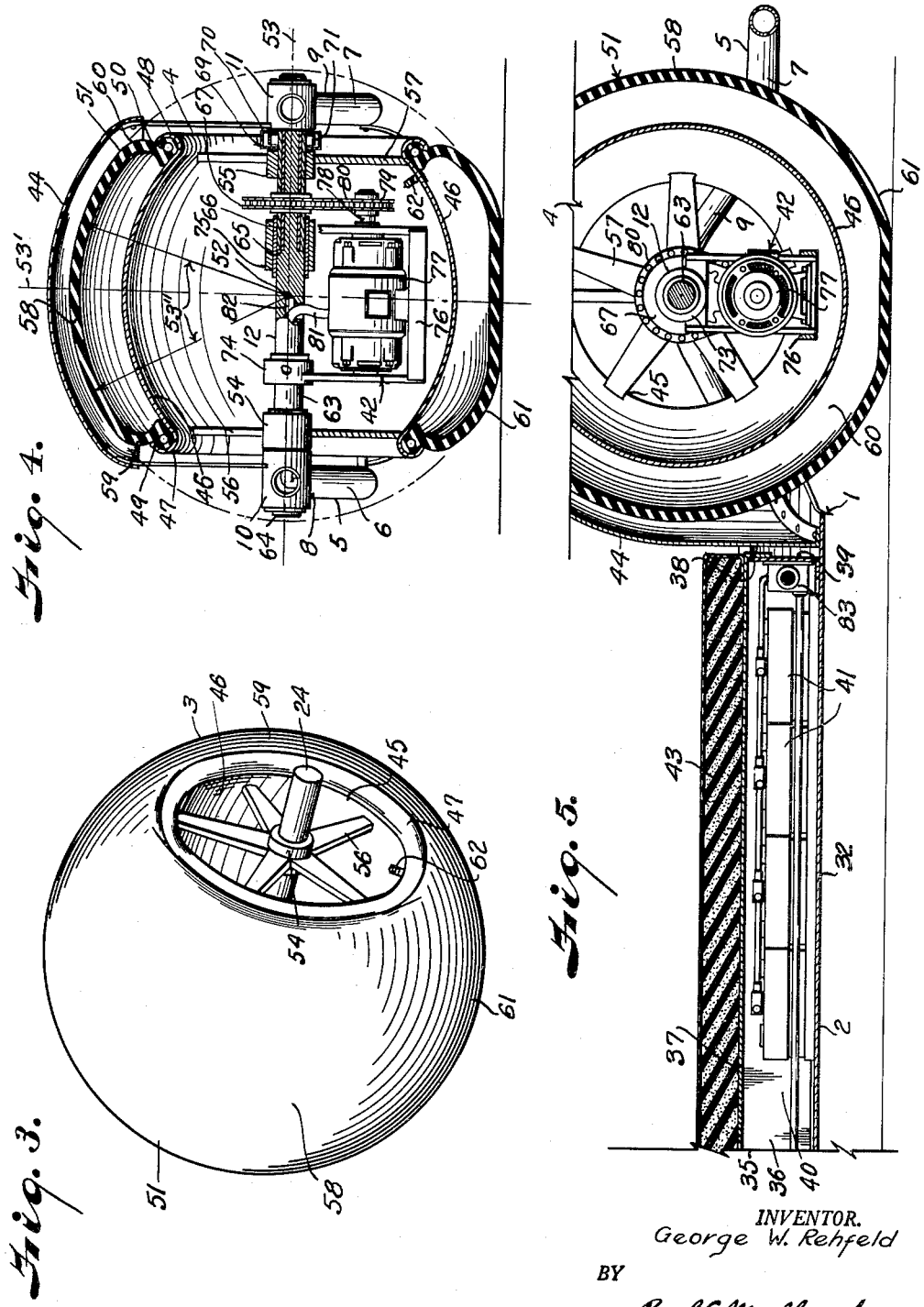

3,016,967
MOTORCYCLE WITH WIDE TREAD WHEELS
George W. Rehfeld, P.O. Box 185, Manhattan, Kans.
Filed Sept. 21, 1959, Ser. No. 841,330
4 Claims. (Cl. 180—30)

This invention relates to a vehicle of the motorcycle type with wide tread wheels, and has for its principal object to provide a vehicle of this character that has substantially complete lateral stability and is capable of retaining an upright position whether in motion or at rest, thereby promoting safety and dependability thereof.

Other objects of the invention are to provide a vehicle of this character which includes a body capable of seating the driver and one or more passengers, with the load suspended below the axis of rotation of the wheels and in a manner to counterbalance forces acting on opposite sides of a longitudinal plane contiguous with the longitudinal median line of the vehicle, and which plane includes the centers of lateral curvature of the wheel treads; to provide means for powering the vehicle which is similarly disposed with respect to the rotational axis of the wheels and the common centers of the wheel treads; to provide a mounting for the power unit within one of the wheels; and to provide a simple and inexpensive light weight structure for this type of vehicle.

In carrying out these and other objects of the invention as hereinafter described, the wheels of the vehicle are characterized by their substantial width with respect to the diameter thereof, and that the treads of the wheels conform in shape to the central belt of a sphere corresponding in diameter to the overall diameter of the wheels, so that all points on the tread of each wheel are equally disposed from a common point corresponding to the center of the sphere, and which point is at all times in the central longitudinal plane of the vehicle and in the axis of wheel rotation, as illustrated in the accompanying drawings, wherein:

FIG. 3 is a perspective view of one of the wheels of the motorcycle, particularly illustrating the spherical or ball-like characteristic thereof.

FIG. 4 is a vertical cross section through the motorcycle, with the section being taken through the rear wheel on the line 4—4 of FIG. 1.

FIG. 5 is a fragmentary vertical longitudinal section through the rear portion of the motorcycle.

Figure 1:
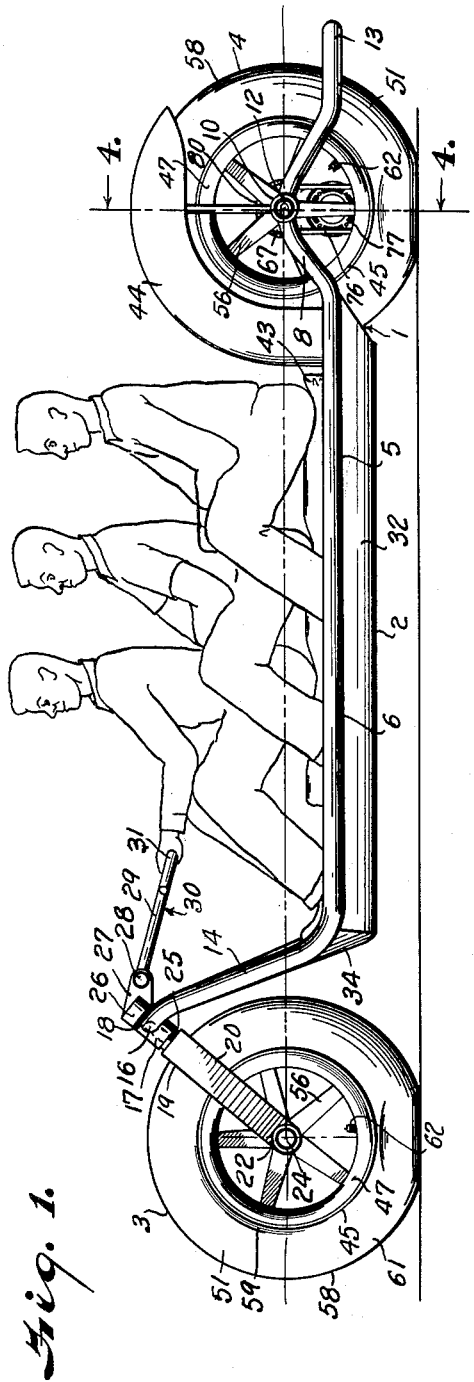
FIG. 1 is a side elevational view of a motorcycle type of vehicle embodying the features of the present invention.

Referring more in detail to the drawings:

1 designates a vehicle of the motorcycle type constructed in accordance with the present invention and which includes a body 2 supported between front and rear wheels 3 and 4. The body 2 may be of any suitable type, but in its simplest form constitutes a tubular frame 5 having laterally spaced longitudinal rails 6 and 7 provided with upwardly offset portions 8 and 9 near the rear ends thereof. The offset portions 8 and 9 carry sleeve 10 and 11, with the axes thereof arranged transversely and in aligning registry. The sleeves are preferably welded into the apical portions of the offsets and mount the ends of a transverse axle assembly 12, later to be described. The longitudinal members are connected rearwardly of the offsets 8 and 9 by a rail 13 adapted to constitute a rear bumper.

The forward ends of the side rails 6 and 7 curve upwardly to provide forwardly extending portions 14 and 15 that are connected at their upper ends at a point over the front wheel by a cross rail 16. The cross rail 16 carries, in the center thereof, a bearing sleeve 17 for journaling the stem 18 of a yoke or fork 19 which mounts the front wheel 3. The yoke 19 has outwardly and downwardly curved arms 20 and 21 terminating in journals 22 and 23 supporting a front axle shaft 24. The yoke at the base of the stem 18 has a shoulder 25 on which the bearing sleeve 17 abuts and the upper end of the stem projects through the opposite end of the bearing sleeve and carries a head 26 that cooperates with the shoulder in fixing the yoke to the frame. The head 26 has rearwardly extending ears 27 carrying a pin 28 for pivotally connecting the shank 29 of a steering lever 30. The steering lever 30 terminates at the free end of the shank in a handlebar 31 which is adapted to be gripped by the operator of the vehicle to turn the yoke or fork 19 for steering the course of the vehicle.

Carried by the longitudinal rear portions of the frame is a bottom or floor 32. The floor 32 is preferably curved transversely and has the sides 33 attached to the side rails 6 and 7. The floor 32 extends from a point near the front of the rear wheel to the upwardly extending portions 14 and 15 at the forward end of the frame. Connected with the forward end of the floor and extending between the frame portions 14 and 15, up to the cross rail 16, is an apron or dash 34 to protect the occupants of the vehicle.

Figure 2:
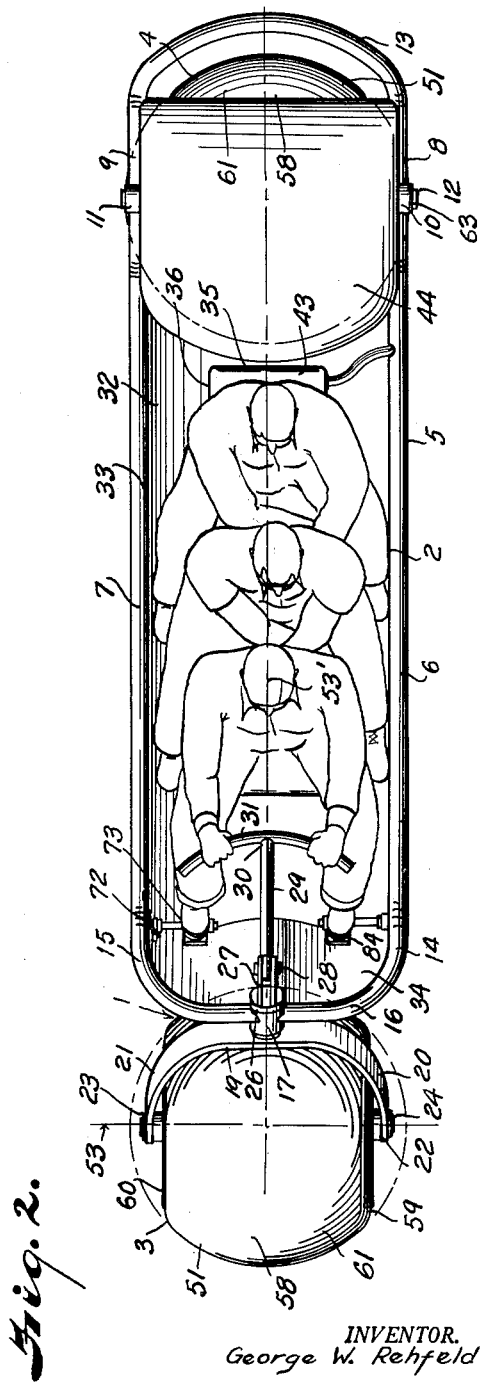
FIG. 2 is a plan view of the motorcycle.

Extending along the floor 32 in the longitudinal center thereof is a housing 35 having side walls 36 thereof spaced inwardly from the side rails 6 and 7 of the frame to accommodate therebetween a footrest for the passengers of the vehicle. The top of the housing 35 is closed by a cover 37 having depending flanges 38 (FIG. 5) telescoping over the side walls 36 and end walls 39 of the housing. The housing thus described provides a compartment 40 for containing luggage, a fuel tank, or, in the instance illustrated, storage batteries 41 for supplying power to operate a power unit 42. Carried on the cover of the housing 35 is a seat cushion 43 on which the operator and passengers are seated, with their legs straddling the housing and their feet supported on the floor at opposite sides thereof, as shown in FIGS. 1 and 2. Fixed to the rear end of the floor and curving upwardly and rearwardly over the rear wheel 4 is a guard or shield 44.

The wheels 3 and 4 are of substantial width and approximately occupy the space between the arms of the fork and the upwardly offset portions of the vehicle frame, as shown in FIG. 2. In fact, the width of the wheels may be up to three-fourths of the diameter. The front and rear wheels are of like construction, in that they include a rim 45 having a transversely arcuate web 46 terminating at sides in flanges 47 and 48 to accommodate the beads 49 and 50 of a tire 51. The transverse curvature of the rim is generated from a common point 52 on the axis 53 of rotation of the wheel, and, therefore, has a shape substantially conforming to the central belt of a sphere, the point being indicated by the crossing points of the dot and dash lines indicating the axis 53 and a dot and dash line 53' representing a plane contiguous with the longitudinal center line of the vehicle (FIGS. 2 and 4). The wheels also include spaced apart hubs 54 and 55 that are joined with the sides of the rim by spokes 56 and 57, as best shown in FIGS. 3 and 4.

The tire 51 is formed of resilient material and includes an annular wide tread portion 58 having sides 59 and 60 carrying the beads 49 and 50 by which the tire is secured to the rim. The tread portion 58 of the tire has a road contacting face 61 corresponding to the central belt of a sphere, and all points on the face thereof are approximately equal distances from the point 52, whereby the tread has the same transverse or lateral curvature as the circumferential curvature thereof as indicated by the radius lines 53" in FIG. 4. To maintain the shape of the tire, the rim 45 of each wheel is provided with an air valve 62 by which air pressure may be introduced into the tire, substantially in accordance with the present day tubeless tire.

The hubs 54 and 55 of the front wheel are mounted on the front axle 24, and the hubs 54 and 55 of the rear wheel are mounted on the rear axle assembly 12. The rear axle assembly (FIG. 4) includes a fixed shaft 63, one end 64 of which extends through the hub 54 of the rear wheel and is fixed within the sleeve 10 so that the shaft is stationary and the hub 54 of the rear wheel turns freely thereon. The other end of the shaft is reduced in diameter to provide a shoulder 65 and extends loosely through the hub 55 and sleeve 11, to accommodate a drive sleeve 66 that is rotatable upon the reduced portion of the shaft. The sleeve 66 carries a sprocket 67 that is fixed thereon. The drive sleeve 66 thus extends through the hub 55 of the rear wheel and is suitably splined thereto to rotate the wheel when the sprocket is rotated. Also mounted on the drive sleeve 66 exteriorly of the hub 55 of the rear wheel is a brake 69 having a drum 70 fixed to the drive sleeve and suitable brake shoes 71 that are adapted to engage therewith and which are supported by the sleeve 11 on the main frame. The shoes of the brake may be actuated by a cable 72 that extends through the side rail 7 and connects with a foot pedal 73 which is mounted on the forward end of the floor in convenient position to be operated by the driver's foot (FIG. 2).

Mounted on the fixed shaft 63 is a collar 74 which cooperates with a bearing collar 75 on the driving sleeve 66 to suspend a support 76 for the power unit 42 (FIGS. 4 and 5). The power unit in the illustrated instance constitutes an electric motor 77. The power shaft 78 of the motor carries a sprocket 79 in alignment with the sprocket 67, and operating over the respective sprockets is a driving chain 80. The motor is preferably a reversible motor, so that the vehicle may be operated in either direction.

The motor circuit includes a conductor cable 81 that extends from the motor through a bore 82 of the fixed section of the rear shaft assembly and through the sleeve 10 and rail 6 to be connected in circuit with a reversing switch and speed controller contained in the housing 83, and which are suitably controlled in circuit with the batteries 41 by a foot pedal 84 located on the opposite side of the floor from the brake pedal, so that the motor may be controlled by the other foot of the operator.

It is to be understood that the specific type of motor and the connections therefor form no part of the present invention, as the power unit may be of various types and have different mounting locations and be provided with controls that are best adapted to a specific mounting and kind of motor. Thus the power unit may comprise an electric motor as shown, on an internal combustion engine, which may be supplied with fuel and equipped with a throttle that is connected with the foot pedal 84, without departing from the spirit of the invention.

With the vehicle constructed as described, it is obvious that the load carried by the body is applied to the wheels below their axis of rotation as brought about by the shape of the frame and the underslung portion of the body that carries the seat for the occupants. Therefore, the load is in effect suspended from the ends of the axles on opposite sides of the common radius points 52 and about which the vehicle may rock upon the uniformly transverse curvature of the treads when making turns, but since the points 52 remain the same distance from the road during any tendency for the vehicle to rock laterally, the load acting substantially equally on opposite sides of the points 52 or plane 53' will bring the vehicle into a stabilized position with the center of the tread in contact with the road. Thus, while the vehicle may rock laterally, it will always return to its stabilized position by reason of the center of gravity being applied below the points 52.

It is also obvious that the wheels are characterized by their ball or spherical contour, and that the treads are substantially wide because they constitute the central belt of a sphere having the diameter of the circumference of the wheels, which, with the low center of gravity, results in lateral stability when the vehicle is in motion or at rest.

It is also apparent that the corresponding transverse curvatures of the rims and tires provide shallow air spaces of uniform width substantially across the width of the body of the vehicle. This is important in handling of the vehicle in case one or the other tire should happen to be punctured while the vehicle is in motion.

What I claim and desire to secure by Letters Patent is:

1. A motorcycle comprising front and rear wheels having treads substantially wide relatively to the diameter of said wheels and said treads curving laterally substantially in accordance with the radius of the circumference of said wheels to provide a substantially wide tread for lateral rocking of the wheels when the cycle is in motion, a frame having a drop portion between the front and rear wheels, a fork, means pivotally connecting the fork with forward portions of said frame, an axle carried by the fork for rotatably mounting the front wheel in said fork, an axle assembly on the rear end of the frame for mounting the rear wheel, a motor, and means suspending the motor from the axle assembly to position the motor below the axle assembly and to cooperate with the drop portion of the frame for maintaining a center of gravity below the axes of said wheels whereby the drop portion of the frame and motor weight cooperate to maintain lateral stability of the wheels when the wheels rock laterally on the lateral curving tread of said wheels.

2. A motorcycle, including front and rear wheels having treads curving circumferentially and transversely on substantially equal radii from common centers located in a vertical longitudinal median plane of the cycle, side rails having load carrying portions spaced from said median plane a distance corresponding to the radii of said wheel treads, axles having ends projecting from the sides of said wheels, a fork having spaced apart arms for accommodating the front wheel therebetween and having connection with the projecting ends of said axle, said side rails having upwardly extending forward end portions interconnected above the front wheel, fork journaling means carried by the interconnecting portion of said rails for mounting said fork, said side rails having upwardly offset portions extending along outer sides of the rear wheel, an axle having ends connected with said upwardly offset portions for mounting the rear wheel to cooperate with the front wheel in supporting the load carrying portions of the side rails at a level substantially below said axles to exert equal stabilizing forces on the ends of the axles to maintain the central periphery of said wheel treads in contact with the road on which the cycle is to travel, and a motor having driving connection with one of said wheels.

3. A motorcycle of the character described having front and rear wheels provided with rims corresponding in shape to the central belt of a sphere and of substantial transverse width relatively to the diameter thereof, and tires for said rims having treads corresponding in shape to the rims for providing air space therebetween of uniform depth across the width of the wheels.

4. A motorcycle including a body having a load-carrying portion and having sides spaced from the vertical longitudinal median plane of the vehicle to accommodate a passenger space between said sides, a passenger seat in said space and supported on said load-carrying portion, a frame carrying the body, transverse axles carried by the frame in the front and rear respectively of the body at a level substantially above the load-carrying portion of the body, front and rear wheels mounted on said axles and each having rims of a width substantially approaching the width of the body and curved transversely on radii from the intersection of the axles with said longitudinal median plane and corresponding with the radii of said rims circumferentially of said axles, and tires on said rims having treads also curving transversely on larger radii than the radii of the rims from said intersection whereby the tread has the contour of the belt of a sphere to exert equal stabilizing forces on ends of the axles by said body, the differences in radii between said rim and tire of the respective wheels providing shallow air spaces of uniform width substantially across the width of said body.

References Cited in the file of this patent

UNITED STATES PATENTS

| | | |
|---|---|---|
| 583,809 | Libbey | June 1, 1897 |
| 1,235,747 | Whitehall | Aug. 7, 1917 |
| 1,989,573 | Von Loutzkoy | Jan. 29, 1935 |
| 2,253,408 | Watkins | Aug. 19, 1941 |
| 2,720,273 | Johnson et al. | Oct. 11, 1955 |

FOREIGN PATENTS

| | | |
|---|---|---|
| 1,005,998 | France | Jan. 9, 1952 |